US007607451B2

(12) United States Patent
Haas

(10) Patent No.: US 7,607,451 B2
(45) Date of Patent: Oct. 27, 2009

(54) DEVICE AND METHOD FOR THE PRODUCTION OF A POWDER-AIR MIXTURE

(75) Inventor: Rainer Haas, Metzingen (DE)

(73) Assignee: Weitmann & Konrad GmbH & Co. KG, Leinfelden-Echterdingen (DE)

( * ) Notice: Subject to any disclaimer, the term of this patent is extended or adjusted under 35 U.S.C. 154(b) by 581 days.

(21) Appl. No.: 10/573,187

(22) PCT Filed: Aug. 22, 2005

(86) PCT No.: PCT/EP2005/009038

§ 371 (c)(1),
(2), (4) Date: Mar. 23, 2006

(87) PCT Pub. No.: WO2006/024417

PCT Pub. Date: Mar. 9, 2006

(65) Prior Publication Data

US 2007/0104544 A1 May 10, 2007

(30) Foreign Application Priority Data

Sep. 2, 2004 (DE) ....................... 10 2004 043 411

(51) Int. Cl.
*B65G 53/46* (2006.01)

(52) U.S. Cl. ........................ 137/268; 406/153; 406/144

(58) Field of Classification Search ................. 137/268; 406/153, 144

See application file for complete search history.

(56) References Cited

U.S. PATENT DOCUMENTS 4,807,814 A 2/1989 Douche et al.
5,186,166 A * 2/1993 Riggs et al. ................. 137/268
5,615,980 A 4/1997 Mauchle
5,730,178 A * 3/1998 Zhadanov et al. ........... 137/268
6,267,540 B1 * 7/2001 Haas .......................... 406/153

FOREIGN PATENT DOCUMENTS

| | | |
|---|---|---|
| DE | 40 40 227 | 6/1992 |
| DE | 44 46 798 | 6/1996 |
| DE | 199 37 557 | 3/2000 |
| DE | 198 23 511 | 1/2002 |
| DE | 101 11 891 | 11/2002 |
| EP | 0 465 043 | 1/1992 |

(Continued)

OTHER PUBLICATIONS

Schiewe, Thilo "Untersuchungen zum Einfluβ der Gutaufgabevorrichtung auf die Stroemungsmechanik in Fallrohrreaktoren". Der Technischen Fakultät der Universität Erlangen-Nürnberg zur Erlangung des Grades Doktor-Ingenieur, Erlangen, 1997.

(Continued)

*Primary Examiner*—Kevin L Lee
(74) *Attorney, Agent, or Firm*—Paul Vincent

(57) ABSTRACT

The invention relates to a device for generating a homogeneous powder-air mixture comprising a pressure section and a suction section, wherein the two sections merge in an outlet, wherein the pressure section terminates in an orthogonal direction in the suction section in an ejector-like manner, the suction section being open towards the surroundings. The invention also relates to a method for generating a homogeneous powder-air mixture.

11 Claims, 1 Drawing Sheet

FOREIGN PATENT DOCUMENTS

| | | |
|---|---|---|
| EP | 0 636 405 | 2/1995 |
| EP | 0 686 430 | 12/1995 |
| EP | 0 763 385 | 3/1997 |
| EP | 0 823 286 | 2/1998 |
| EP | 0 913 203 | 5/1999 |
| EP | 1 104 334 | 6/2001 |
| GB | 2 118 865 | 11/1983 |

OTHER PUBLICATIONS

Schlag, Hans-Peter "Experimentelle und theoretische Untersuchungen zur Berechnung der Kennlinien von gasbetriebenen Einphaseninjektoren und Gutaufgabeninjektoren". Fortschr.-Ber. VDI Reihe 3 Nr. 313. Duesseldorf: VDI-Verlag 1993.

* cited by examiner

DEVICE AND METHOD FOR THE PRODUCTION OF A POWDER-AIR MIXTURE

This application is the national stage of PCT/EP2005/009038 filed on Aug. 22, 2005 and also claims Paris Convention priority of DE 10 2004 043 411.5 filed on Sep. 2, 2004.

BACKGROUND OF THE INVENTION

The invention relates to a device for producing a homogeneous powder-air mixture, the device comprising a pressure section and a suction section, wherein the two sections merge in an outlet. The invention also relates to a method for generating a homogeneous powder-air mixture.

Devices for mixing powder and air are conventionally known. Powder-air mixtures of this type are required i.a. in the printing industry for dusting freshly printed sheets. DE 199 37 557 A1 discloses a device of this type, wherein powder and air are mixed. The powder-air mixture generated by this device is, however, not sufficiently homogeneous.

Other devices have been proposed for producing a more homogeneous mixture. EP 0 636 405 A2 e.g. discloses a device for mixing a solid matter jet with gas, which attempts to generate a homogeneous mixture of solid matter and air using a coaxially disposed lance. Such devices are very expensive to construct and their operation is susceptible to disturbances.

The thesis "Untersuchungen zum Einfluss der Gutaufgabevorrichtung auf die Strömungsmechanik in Fallrohrreaktoren" (Investigations of the Influence of the Material Feeding Device on the Flow Mechanics in Downpipe Reactors) from the technical faculty of the University Erlangen-Nürnberg, Thilo Schiebe, 1997, pages 104 and 105 describes a device into which primary air, fluidizing air, dividing air, and solid matter are fed and mixed within the device, the mixture being discharged in a downpipe. This structure is also expensive, with the fluidizing air being required to whirl the solid matter in a fluidized bed and mix it with the dividing air.

The published series from VDI publishers "Experimentelle und theoretische Untersuchungen zur Berechnung der Kennlinien von gasbetriebenen Einphaseninjektoren und Gutaufgabeinjektoren" (Experimental and Theoretical Studies for Calculating the Characteristic Curves of Gas-operated Single-phase Injectors and Material Feed Injectors) Düsseldorf, 1993, pages 48 and 49, 70 and 71 describes a single-phase injector in which two gases are mixed. The driving jet mass flow is divided into four partial flows and supplied to the injector. Devices of this type are not suitable for industrial use due to their complicated structure and insufficient reliability.

It is therefore the underlying purpose of the invention to provide a device for generating a homogeneous powder-air mixture that has a simple construction and guarantees the production of a homogeneous mixture.

SUMMARY OF THE INVENTION

This object is achieved in accordance with the invention with a device of the above-mentioned type in that the pressure section terminates, preferentially in an orthogonal direction, in the suction section in an ejector-like manner, the suction section being open towards the outside.

An inhomogeneous powder-air pre-mixture is supplied to the inventive device via the pressure section, wherein this mixture is supplied with large flow velocity and suctions air from the suction section and becomes mixed with this suctioned air. The air is suctioned from the surroundings and need not be specially supplied. The previously produced inhomogeneous powder-air mixture having the large flow velocity mentioned above, is supplied via a pressure line which terminates in the pressure section.

In order to supply the inhomogeneous powder-air mixture with ambient air in as uniform a manner as possible, the pressure section is completely surrounded by the suction section. This has the result that the powder-air mixture suctions the air in a uniform and even manner and can be uniformly mixed with the suctioned air. In accordance with the invention, the pressure section is jacketed by the suction section. In other words, the pressure section terminates in the center of the suction section.

In a preferred embodiment, the suction section comprises several openings or suction openings that open towards the surroundings. These suction openings extend in a radial direction, are disposed radially about the pressure section, and terminate in the surroundings. In one variant, the suction openings extend at an angle with respect to the radius. This causes the suctioned air to be twisted.

The suction openings are advantageously uniformly disposed about the periphery of the pressure section. This additionally promotes uniform mixing of the inhomogeneous powder-air mixture with the suctioned ambient air.

In one embodiment, the outlet has a cylindrical shape and is, in particular, circular. This outlet contains the homogeneous powder-air mixture which is supplied to the consumer, e.g. a dusting system. To maintain the flow velocity, the outlet is not designed as a diffuser rather has a uniform cross-sectional size to also ensure uniform velocity of the homogeneous powder-air mixture over the cross-section.

The velocity is, however, increased in the suction section which conically tapers in the flow direction producing large suction forces such that the ambient air which flows-in from a radial direction with large velocity is homogeneously mixed with the inhomogeneous powder-air mixture.

In one embodiment, the outlet of an upstream mixer producing an inhomogeneous powder-compressed air mixture terminates in the suction section. A mixture of this type may e.g. be produced by a device in accordance with DE 199 37 557 A1. This mixture has the flow velocity required for the inventive device which ensures that a sufficient amount of ambient air can be suctioned via the suction section and that this ambient air is mixed with the pre-mixture through intensive whirling in the suction section and/or outlet.

The above-mentioned object is also achieved with a method, with which a pressurized inhomogeneous powder-air pre-mixture is blown into a suction section thereby suctioning ambient air, and is mixed with this ambient air in the suction section and/or in an outlet to form a homogeneous powder-air mixture. The ambient air is thereby supplied to the inhomogeneous powder-air pre-mixture from a direction orthogonal to the flow direction of the latter.

Further advantages, features and details of the invention can be extracted from the dependent claims and the following description which describes a particularly preferred embodiment with reference to the drawing. The features shown in the drawing and mentioned in the claims and in the description may be essential to the invention either individually or in arbitrary combination.

DESCRIPTION OF THE PREFERRED EMBODIMENT

Figure 1:
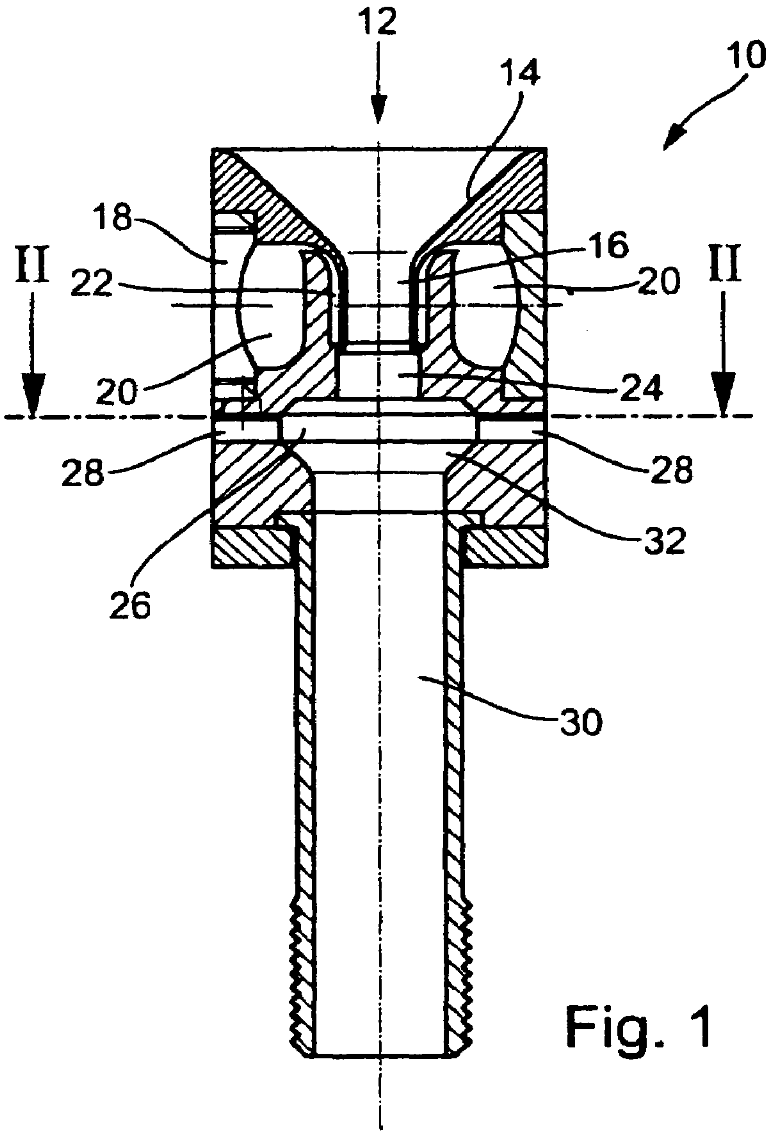
FIG. 1 shows a longitudinal section through a device for generating a powder-air mixture.

FIG. 1 shows a device, referred to in total with 10, for generating a homogeneous powder-air mixture which is used e.g. in a dusting means for dusting printed paper sheets in a printing machine. Powder is thereby supplied from a supply container (not shown) via a dosing means (not shown) in the direction of arrow 12. This powder falls into a funnel 14 which terminates in a suction line 16. Reference numeral 18 designates a line nozzle for supplying compressed air. This line nozzle 18 terminates in an annular distribution space 20 in which the compressed air is uniformly guided into an annular space 22. The compressed air in this annular space 22 is downwardly deflected around the suction line 16, thereby forming an envelope jet. The suction line 16 terminates in this envelope jet with the consequence that powder from the funnel 14 and the suction line 16 is carried along by the envelope jet.

Figure 2:
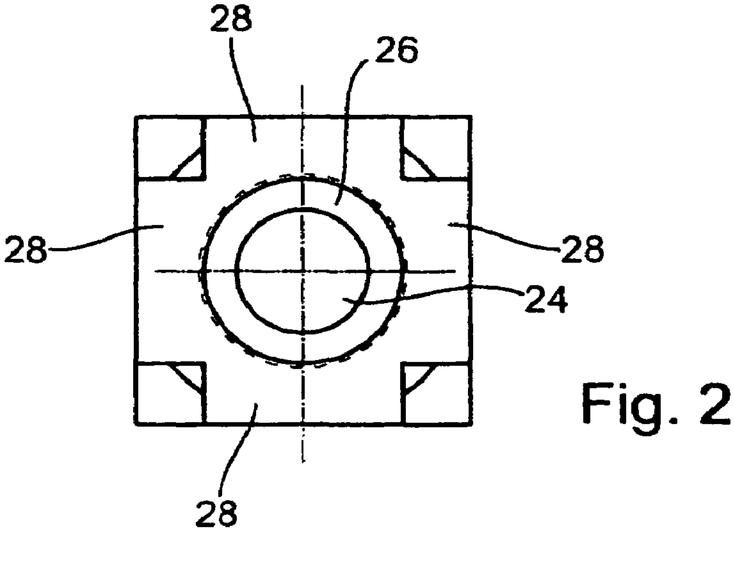
FIG. 2 shows a section II in accordance with FIG. 1.

This mixture of powder and air has a flow velocity but is still inhomogeneous and is located in a pressure section 24 in which it flows in a vertical, downward direction. It thereby flows through a suction section 26 which radially surrounds the pressure section 24 and is radially open to the surroundings via openings 28 (a total of 4 openings). This is clearly shown in FIG. 2. A circular cylindrical outlet 30 joins the suction section 26 in an axial direction.

The inhomogeneous powder-air pre-mixture flows under pressure into the pressure section 24 and suctions air into the suction section 26 from the surroundings via the openings 28. The inhomogeneous powder-air pre-mixture and the radially suctioned ambient air are mixed in a conically tapering section 32 and form a homogeneous powder-air mixture which is blown out via the outlet 30. In particular, the powder core still present in the pressure section 24, which is surrounded by an envelope jet of compressed air, is dissolved and the powder is homogeneously mixed by the added, radially injected suction air, thereby obtaining a homogeneous powder distribution over the cross-section at the exit of the outlet 30.

The overall device 10 can be produced on the lathe, is axially assembled, clamped and held together using suitable elements such as e.g. screws or the like.

Since ambient air is suctioned via the openings 28, there is less stray powder in the surroundings, thereby reducing the degree of soiling of the printing machines. Of course, it is also possible to supply these openings 28 with ambient air which is soiled, in particular with powder, using suitable hose pipes. This ambient air may e.g. be suctioned from the region containing the dusting nozzles.

I claim:

1. A device for generating a homogeneous powder-air mixture, the device comprising:

an intake region for powder, said intake region surrounded by pressurized air forming an enveloping jet;

a pressure section adjacent to and downstream of said intake region, said pressure section extending in an axial direction;

a suction section, extending in a radial direction and having openings communicating with surroundings of the device, wherein said pressure section feeds into said suction section in an orthogonal direction, with said suction section completely surrounding said pressure section; and an outlet region disposed immediately downstream of said suction section.

2. The device of claim 1, wherein said intake region carries an inhomogeneous powder-air pre-mixture which terminates in said pressure section.

3. The device of claim 1, wherein said suction section carries ambient air.

4. The device of claim 1, wherein said pressure section is jacketed by said suction section.

5. The device of claim 1, wherein said suction section has several suction passages or openings that feed to surroundings.

6. The device of claim 5, wherein said suction passages or openings are uniformly distributed about a periphery of said suction section.

7. The device of claim 5, wherein said suction passages or openings are disposed in a radial direction.

8. The device of claim 5, wherein said suction passages or openings are at an angle with respect to a radial direction.

9. The device of claim 1, wherein an outlet has a cylindrical design.

10. The device of claim 1, wherein said suction section conically tapers in a flow direction.

11. The device of claim 1, further comprising an upstream mixer generating a powder-compressed air mixture and having an outlet terminating in said suction section.

* * * * *